(No Model.)
H. C. SPALDING.
MEANS FOR PROTECTING ELECTRICAL CONDUCTORS FROM THE HEAT OF SUBTERRANEAN STEAM PIPES.
No. 327,468. Patented Sept. 29, 1885.
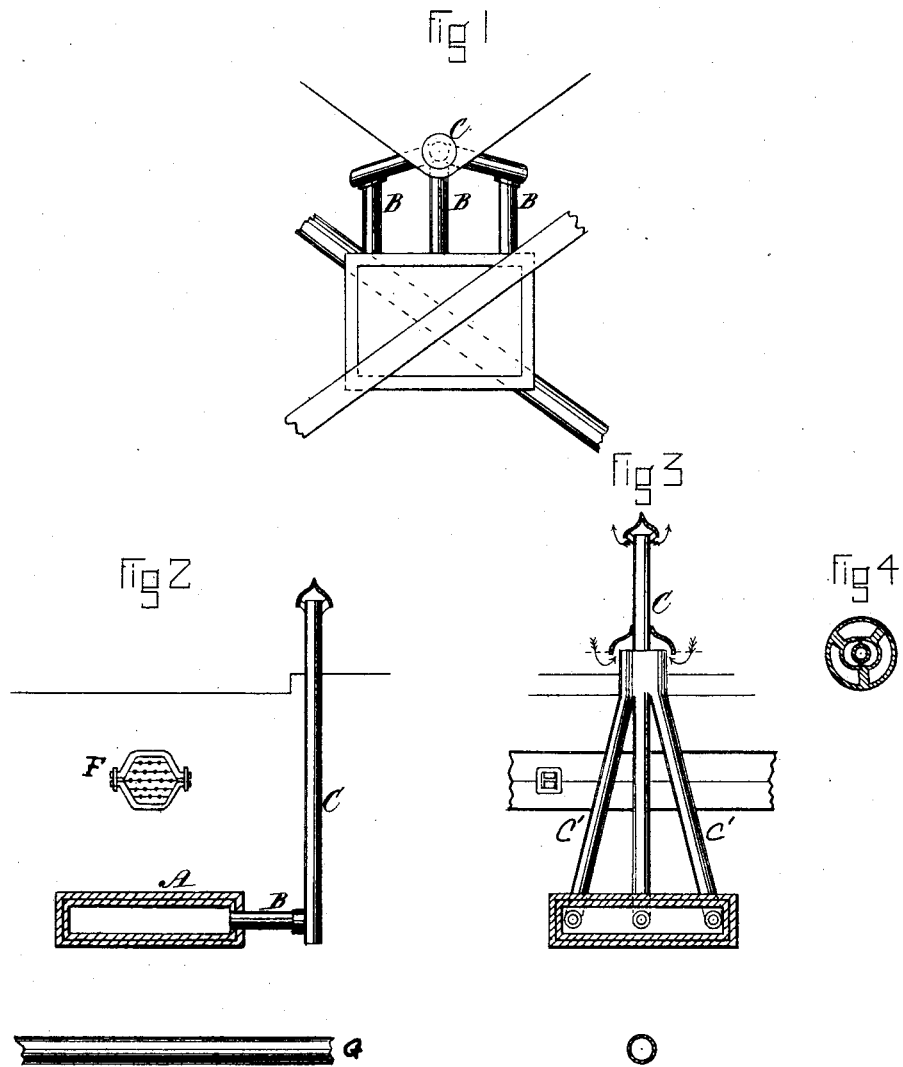
WITNESSES
H. D. Hartley.
W. H. Doggett.
INVENTOR
Henry C. Spalding
By Parker W. Page
atty.

UNITED STATES PATENT OFFICE.

HENRY C. SPALDING, OF BOSTON, MASSACHUSETTS.

MEANS FOR PROTECTING ELECTRICAL CONDUCTORS FROM THE HEAT OF SUBTERRANEAN STEAM-PIPES.

SPECIFICATION forming part of Letters Patent No. 327,468, dated September 29, 1885.

Application filed February 23, 1884. Renewed February 28, 1885. (No model.)

*To all whom it may concern:*

Be it known that I, HENRY C. SPALDING, a citizen of the United States, and a resident of Boston, in the county of Suffolk and State of Massachusetts, have invented new and useful Means for Protecting Electrical Conductors from the Heat of Subterranean Steam-Pipes, of which the following is a specification, reference being had to the drawings accompanying and forming a part of the same.

This invention relates to systems of electrical conductors in which pipes or conduits containing the insulated conductors are laid underground in the streets of cities or towns. The object of the invention is to prevent injury to the conductors, their insulating-coatings, or the materials in which they are or may be embedded, from the heat of subterranean steam or hot-air pipes, such as are now commonly employed as a means of supplying and distributing heat and power. For this purpose I interpose ventilated chambers between the steam or hot-air pipes and those containing the conductors wherever the two come into such proximity that the conductors would be liable to injury from the heat. This method of protection is applicable generally to all kinds of conduit or pipe systems, but more particularly to those containing a plastic insulating material, such as I have described in an application filed by me December 7, 1881.

In laying the pipes or conduits for electrical conductors great care should be exercised not to run them near or parallel to subterranean steam-pipes. It will generally be necessary, however, when the two systems are laid in the same streets, to cross the pipes frequently, as at the intersection of streets. I therefore place in the earth, between the steam-pipe and the conduit, a box or chamber provided with means for ventilating the same, by which the heat is prevented from reaching and injuriously affecting the insulating compounds in which the wires are embedded. The particular construction of this device and the manner of using or applying the same are illustrated in the accompanying drawings.

Figure 1 is a plan view of a box or chamber, and the means for ventilating the same, adapted for use with the pipes of the two systems at their point of intersection. Figs. 2 and 3 are cross-sectional views of the box or chamber, showing also the steam-pipes and those containing the conductors. Fig. 4 is a section through the ventilating tubes or pipes from the box.

F designates the pipe or conduit containing the electrical conductors, and G a steam or hot-air pipe in proximity thereto. At the point of intersection of these pipes, and at equal distances from each, is the box A, composed preferably of cast-iron and lined with a substance, H, that is a non-conductor of heat. A ventilating-tube, C, extending above the surface of the ground, communicates with the interior of the box. It is convenient to run a horizontal branch pipe, B, from the box and to connect this with the vertical pipe C, when the pipes F and G cross each other at any distance from the curb of the street.

For more perfect ventilation I use a pipe having branches, as C′ C′, which connect with the box by horizontal pipes B B, as shown in Figs. 1 and 3. Of these branches the center one is extended up about two feet above the others, and both it and the branches C′ C′ are covered by caps D D′, that prevent dirt and water from entering the box, but which allow a free circulation of air. With such an arrangement as this the heated air escapes through the higher branch C, and cooler air passes through the branches C′ C′ into the box.

Though described as applied in a special place, and shown as used with a particular kind of conduit, it is evident that the ventilating-chamber may be used generally wherever similar conditions obtain. Its size will depend upon that of the pipes or conduits with which it is employed, and its shape may be greatly varied. It should, however, be rectangular, and not smaller than two feet square. It may be of cast-iron, in one piece or more, and should be made perfectly water-tight.

What I claim is—

1. As a means of preventing injury to underground conductors from the heat of adjacent steam or hot-air pipes, the combination with said conductors, of a ventilated box or chamber placed between the pipe or conduit containing them and the steam-pipe, substantially as set forth.

2. The combination, with an underground conduit containing electrical conductors, of a box or chamber, and ventilating tubes or pipes extending from the same above the surface of the ground, the box being interposed between the conduit and a steam or hot-air pipe when in proximity to the conduit, for the purpose of preventing injury to the conductors by heat, as set forth.

In witness whereof I have hereunto signed to my name in presence of two subscribing witnesses.

HENRY C. SPALDING.

Witnesses:
ALEX. L. HAYES,
SANFORD H. DUDLEY.